Sept. 6, 1966 W. P. WILDERMUTH 3,271,094
ADJUSTABLE EYEGLASS TEMPLE UNIT
Filed Nov. 28, 1961
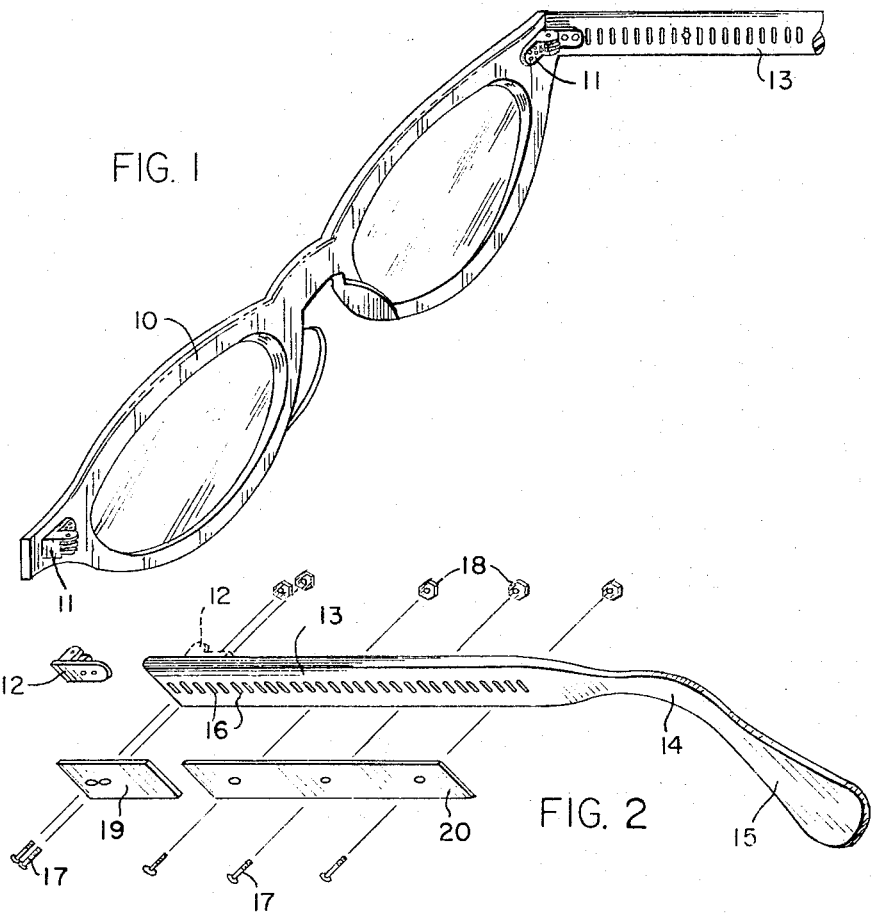
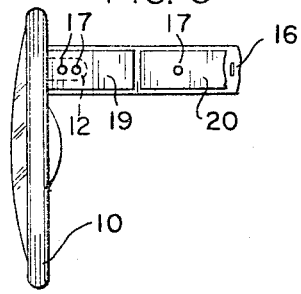
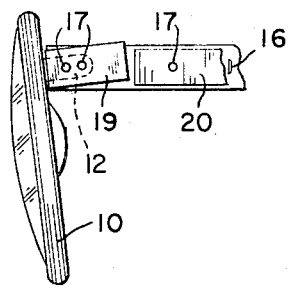
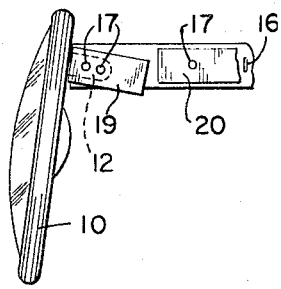
INVENTOR
W. P. WILDERMUTH
BY
ATTORNEY

United States Patent Office 3,271,094
Patented Sept. 6, 1966

3,271,094
ADJUSTABLE EYEGLASS TEMPLE UNIT
Wallace P. Wildermuth, Lead, S. Dak.
Filed Nov. 28, 1961, Ser. No. 155,354
1 Claim. (Cl. 351—120)

This invention relates to accessories and equipment worn on the person for the comfort and convenience of individual as well as for improving the appearance and includes articles which facilitate the normal activity in the use of certain of the human senses.

The invention relates particularly to spectacles or eyeglasses which ordinarily have to be made in different sizes and shapes and the lenses of which have to be set at different angles to meet the needs of specific individuals as well as spectacles or eyeglasses of construction facilitating their being readily fitted and adjusted.

In order to supply the needs of the public it has been customary to provide a large stock of spectacles or eye-glasses of many sizes, colors, trims, and the like, and in order to fit the eyeglasses to individuals and to repair and replace worn or broken parts considerable manipulation and adjustment has been necessary by persons of special experience and with special equipment all of which has presented a considerable problem.

It is an object of the invention to provide a basic eyeglass unit capable of quick temple replacement regardless of length or size, whether for right or left location and which will allow temple adjustment for pantascopic and retroscopic effect without force or stress on the frame hinge, thereby reducing the number of stock sizes, colors, and trims.

Another object of the invention is to provide an eyeglass unit by which the repair and replacement of worn or broken parts can be accomplished by inexperienced personnel, and without special facilities or equipment.

Another object of the invention is to provide a basic eyeglass unit which will solve the problem of providing odd sizes for spectacle wearers ranging from an overall maximum length required to that of the shortest length in temples and capable of being cut or modified to the proper size.

A further object of the invention is to provide an eyeglass temple which may be used at the right or the left and including special means for the adjustable angular attachment of the temple to the hinge after the temple is cut to the proper length as well as the provision of temples with specially designed slots for unlimited length selection and the substitution of optical screws and nuts for conventional pins and rivets as well as simple trim, mounting and assembly.

Other objects and advantages of the invention will become apparent from the following description taken in conjunction with the accompanying drawings wherein:

FIG. 1 is a perspective of an eyeglass or spectacle frame or unit;

FIG. 2, a perspective of the temple and means for mounting the same on the frame of FIG. 1; and FIGS. 3, 4, and 5, side elevations illustrating the optical positions of the eyeglass lenses the angle of which can be adjusted by changing the angle at the hinge.

Briefly stated, the invention is a basic unit design for spectacle or eyeglass temples which can be used on either the right or the left side, and can have a portion detached to obtain the desired length for proper fitting, such temples being provided with spaced slots along the length of the same for length adjustment and for angular adjustment as well, optical screws and nuts being employed for fastening the temples to the eyeglass frame with slots in the temples permitting adjustment of the screws therein to obtain the desired angularity.

With continued reference to the drawings, an eyeglass frame 10 is provided, having a hinge element 11, for the attachment of a temple member thereto by means of a complementary hinge element 12. A basic design for an adaptable or adjustable spectacle or eyeglass temple 13 is provided wherein the temple member includes a mounting portion at one end and an ear-engaging portion at its opposite end with a smaller or neck portion intermediate of and integral with the two end portions, as shown in FIG. 2.

More specifically, as shown in FIGS. 1 and 2, the major portion of the temple 13 comprises an elongated member, generally of rectangular section having flat, parallel and relatively wide opposite vertical side faces and relatively narrow top and bottom sides. This major portion of the temple member 13 is provided throughout its length with a plurality of relatively closely spaced and parallel elongated apertures or slots 16 therein extending transversely of its longitudinal axis. The mounting end of the temple member is pivotally connected to a first hinge element 11 fixedly secured to one end of the eyeglass frame by means of a complementary second hinge element 12 having a pair of screw-receiving apertures spaced along its length so as to register with a pair of the elongated apertures 16 in the temple member. One flat vertical side of the temple member is mountingly held against the second hinge element 12 by means of screw fasteners 17 passing through the registering apertures of the hinge element and temple member with securing nuts 18 on the ends of the screw fasteners at the opposite side of the temple member to releasably secure the latter on the hinge element. To reinforce this mounting connection a small preferably generally rectangular back-up or base plate 19 is provided at the outer side of the temple 13 intermediate the heads of the screw fasteners and the temple member, the plate 19 being apertured to accommodate the passage of the fastener screws 17, as indicated in FIG. 2. A trim panel 20 may also be similarly mounted by other fasteners 17, 18 to overlie the remaining exposed apertures 16 as shown.

The vertical length of the elongated slots or apertures 16 is preferably twice their width in order to enable two types of angular adjustment of the eyeglass frame 10 relative to the temple member to be made, such as retroscopic or downwardly and backward adjustment (FIG. 4) and pantoscopic or upwardly and forward adjustment thereof (FIG. 5). To effect retroscopic adjustment the eyeglass frame 10 carrying hinge elements 11, 12 after fastener screw nuts 18 are loosened, is tilted backwardly relative to the temple member 13 to place the forward screw 17 (closest to frame 10) in a low position in its associated slot 16 and the rear screw in an upper position in its associated slot 16, after which their respective nuts 18 are tightened to thereby fixedly clamp the parts together in their adjusted position. For retroscopic adjustment (FIG. 5) the positions of hinge element 12 and fastener screws 17 are reversed with respect to those just described.

It will be understood that the temples each may be made of any desired material and of any convenient overall length sufficient for the longest temple units to provide temples of the proper or desired length. The transversely extending elongated apertures 16 provide for relatively easy selective detachment of end portions thereof. Also the temples may be decorated or ornamented in any desired manner for cosmetic variety without modifying the inventive concept. Such ornamentation may be in connection with the base plates 19 and the trim panel 20 which may be used individually or collectively. Further the remote ends of the temples may be integral or otherwise capable of being conformed to the desired configuration. With the temple illustrated change in optical position of the lenses can be accomplished without stress, strain, or distortion by the loosening of the nuts 18 making the desired adjustment in setting and then tightening the nuts.

It will be understood that the basic straight unit illustrated will be applicable to and sufficient for the vast majority of needs, and from it a temple can be provided of any required length, can be made straight for use on either the right or left sides, can be composed of the desired colors, can have additional ornamentation by attachment of a plaque or the like. Any standard hinge can be used for attaching the temples to the frame with the connection between the hinges and the temples adjustable for obtaining the desired frame tilt known as either normal pantoscopic or retroscopic without putting stress on the hinges and the joints. Further in view of the use of the specific frames slotted temples and attaching screws and nuts, a minimum of knowledge and experience will be necessary to fit the spectacles or eyeglasses and to make the necessary adjustments. At the same time the basic unit will eliminate the necessity for large stocks of right and left temples of varying lengths and odd sizes heretofore required but ordinarily unavailable, and will allow trim changes without special tools or professional help as well as immediate selection of shorter or longer temple lengths.

It will be obvious to those skilled in the art that various changes may be made in the invention without departing from the spirit and scope thereof and, therefore, the invention is not limited by that which is illustrated in the drawing and described in the specification, but only as indicated in the accompanying claim.

What is claimed is:

An interchangeable and length adjustable eyeglass temple member for pivotal attachment to one end of an eyeglass frame, said temple member comprising an elongated member generally of rectangular section having flat parallel and relatively wide opposite vertical side faces and relatively narrow upper and bottom sides, one of said flat vertical side faces providing an attaching portion at one end thereof for an eyeglass frame and an ear-engaging portion at the opposite end thereof, a plurality of parallel and relatively closely spaced elongated apertures extending transversely through said temple member substantially at right angles to the longitudinal axis thereof, said plurality of elongated transversely positioned apertures extending adjacent the attaching end of said temple member to provide for selective detachment of end portions thereof to vary its length to fit the wearer, a first hinge member fixedly mountable on the attaching end portion of an eyeglass frame, a second hinge member cooperatively pivotally engageable with said first hinge member and having releasable securing means coacting with a pair of said elongated apertures in said temple member adjacent the attaching end thereof for adjustably and fixedly mounting said second hinge member on one flat vertical side of the attaching end of said temple member, a reinforcing back-up plate disposed along the other flat vertical side of said temple member and opposite said second hinge member and fixedly held in position against said other side of the temple member by said securing means, said elongated apertures coacting with said releasable securing means to provide for angular adjustment of said temple member relative to said second hinge member in the plane of said temple member.

References Cited by the Examiner

UNITED STATES PATENTS

| | | | |
|---|---|---|---|
| 770,645 | 9/1904 | Lundgren | 88—20 |
| 1,252,126 | 1/1918 | Letzeisen | 88—52 |
| 1,910,743 | 5/1933 | Bouchard | 88—52 |
| 1,984,136 | 12/1934 | Kapernick | 88—53 |
| 2,172,959 | 9/1939 | Hirtenstein | 88—52 |
| 2,427,469 | 9/1947 | Morley et al. | 88—53 |
| 2,629,196 | 2/1953 | Splaine | 88—52 |
| 3,189,912 | 6/1965 | Miller | 351—115 |

FOREIGN PATENTS

| | | |
|---|---|---|
| 802,302 | 6/1936 | France. |
| 500,244 | 2/1939 | Great Britain. |
| 474,361 | 9/1952 | Italy. |

OTHER REFERENCES

Optical Journal-Review of Optometry, February 15, 1956, vol. XCIII, No. 4, page 46.

JEWELL H. PEDERSEN, *Primary Examiner.*

WILLIAM MISIEK, *Examiner.*

D. HORN, T. L. HUDSON, *Assistant Examiners.*